(12) United States Patent
Antoine et al.

(10) Patent No.: US 7,671,296 B2
(45) Date of Patent: Mar. 2, 2010

(54) NOSE-PIECE FOR A LASER-BEAM DRILLING OR MACHINING HEAD

(75) Inventors: Lucien Louis Nicolas Antoine, Franconville (FR); Herve Jacques Christian Guesdon, Le Pre Saint-Gervais (FR); Fabrice Frederic Louis Schuster, Osny (FR)

(73) Assignee: SNECMA, Paris (FR)

( * ) Notice: Subject to any disclaimer, the term of this patent is extended or adjusted under 35 U.S.C. 154(b) by 848 days.

(21) Appl. No.: 11/257,002

(22) Filed: Oct. 25, 2005

(65) Prior Publication Data

US 2006/0096965 A1    May 11, 2006

(30) Foreign Application Priority Data

Oct. 25, 2004   (FR) .................... 04 52437

(51) Int. Cl.
*B23K 26/00* (2006.01)
(52) U.S. Cl. .................. 219/121.7; 219/121.67
(58) Field of Classification Search .............. 219/121.7, 219/121.71, 121.67, 121.72
See application file for complete search history.

(56) References Cited

U.S. PATENT DOCUMENTS

| | | | | |
|---|---|---|---|---|
| 4,468,168 A | * | 8/1984 | Aubert | 415/116 |
| 4,839,495 A | * | 6/1989 | Kitera et al. | 219/121.63 |
| 5,132,509 A | * | 7/1992 | Hayakawa | 219/121.67 |
| 5,607,607 A | * | 3/1997 | Naiman et al. | 219/121.68 |
| 6,380,512 B1 | * | 4/2002 | Emer | 219/121.71 |
| 6,770,839 B2 | * | 8/2004 | Mangiarino et al. | 219/121.63 |
| 6,946,618 B2 | * | 9/2005 | Tamura et al. | 219/121.63 |
| 7,259,353 B2 | * | 8/2007 | Guo | 219/121.63 |
| 2004/0238504 A1 | * | 12/2004 | Aubry et al. | 219/121.63 |
| 2005/0120555 A1 | * | 6/2005 | Boudereau et al. | 29/889.1 |

FOREIGN PATENT DOCUMENTS

| | | |
|---|---|---|
| EP | 0 876 870 A1 | 11/1998 |
| EP | 1 127 652 A1 | 8/2001 |
| EP | 1 273 382 A1 | 1/2003 |
| FR | 2 683 896 A1 | 5/1993 |
| FR | 2 850 892 A1 | 8/2004 |

* cited by examiner

*Primary Examiner*—M. Alexandra Elve
(74) *Attorney, Agent, or Firm*—Oblon, Spivak, McClelland, Maier & Neustadt, L.L.P.

(57) ABSTRACT

The present invention concerns the nose-piece of a laser-beam drilling head for a drilling machine, emitting a pulsed laser beam, where the drill head includes a resource which is suitable for mounting the nose-piece, where the nose-piece includes a first laser beam entry opening and a second pulsed laser beam exit opening and a beam focusing resource arranged upstream of the second opening, characterized by the fact that a mirror is positioned in the optical path of the laser beam downstream of the said beam-forming resource, so that the emerging beam forms an angle of less than 180° with the entering beam, and where the nose-piece includes a laser-beam fluid assisting feed that is arranged so that the said fluid is emitted via the second opening in the direction of the laser beam.

8 Claims, 1 Drawing Sheet

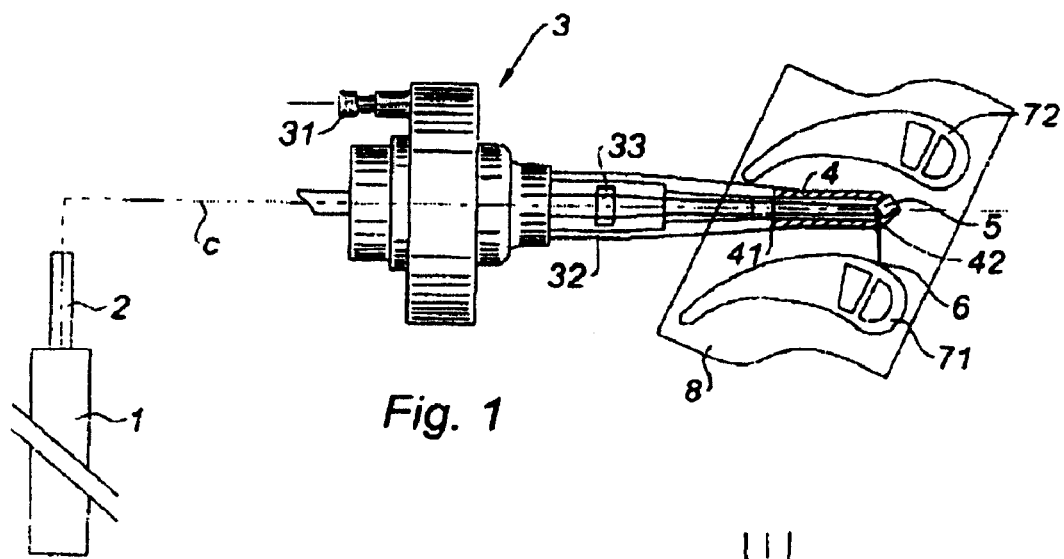
Fig. 1
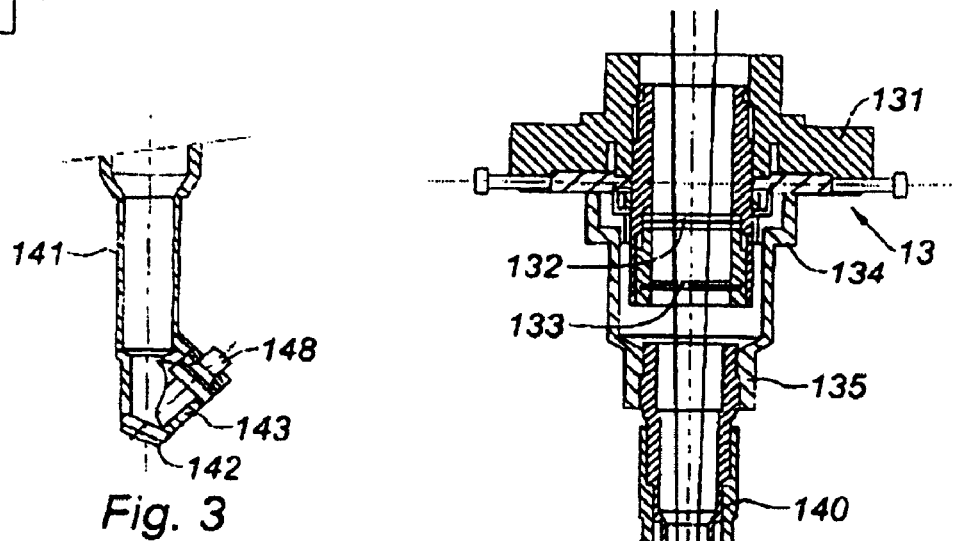
Fig. 3
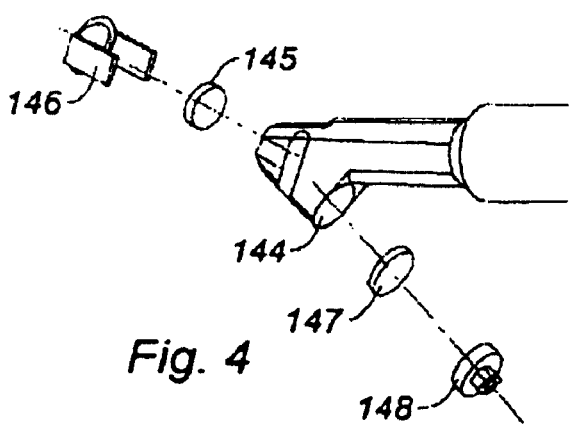
Fig. 4
Fig. 2

NOSE-PIECE FOR A LASER-BEAM DRILLING OR MACHINING HEAD

This present invention relates to the drilling of metal or non-metal parts by means of a laser beam.

In particular, it concerns a nose-piece for the laser beam drilling head of a laser beam machining device used in particular for the drilling of orifices in a wall, metal or otherwise, which is inaccessible or difficult to reach with laser beam drilling tools of previous design.

In the aeronautical industry, it is now common to employ the technique of pulsed laser beams of the YAG Nd type to drill orifices of small diameter in the walls of certain engine parts, including a turbine or a compressor. As an example, these can be parts that are subjected to high temperatures, such as the turbine blades or the fins of distributors in the high-pressure part of the machine, or indeed the wall elements of the engine combustion chamber. The purpose of these orifices is to allow the flow of air streams from the interior of the part, for the purpose of cooling and thermal protection.

According to this drilling technique, a laser beam pulse, of appropriate energy, is directed against the wall, and focussed on the area to be drilled. The material is then raised to a high temperature, causing local melting and vaporisation. The molten material is expelled by the assistance fluid which is injected in the axis of the beam, leaving an orifice in the wall. This technique is employed currently to drill generally cylindrical orifices, with diameters ranging from 0.2 mm to 1.5 mm and a depth of 0.8 to 20 mm, as well as bores of various shapes including diamonds, shaped holes, etc. The materials concerned in the area of gas-turbine engines are mainly nickel or cobalt based alloys, possibly with a coating forming a thermal barrier. However all materials are concerned. According to one example, a pulsed laser beam of the YAG Nd type, used in this area of application, produces energy of 4 Joules at a frequency of 30 Hz with a pulse length of 1.2 ms and a peak power of 3.3 kW giving a mean power of 120 W.

The laser-beam machining devices used currently include a machining head of approximately tubular or truncated-cone shape having an optical system with at least one beam-focussing lens, by which the emitted beam is concentrated into a denser beam at a distance determined by the focal length of the optics. The head ends in a straight nose-piece traversed by the beam, and also forming an injection nozzle for the assistance fluid, which can be gas for example. The beam is placed at an angle that is determined in relation to the surface of the zone to be treated, for the drilling of holes. Because of the structure of the machining head and its geometry, adequate space must therefore be available in the axis of the hole to be drilled in the wall in order to enable the tool to be positioned. In the current technology, this space is at least that between the focus point (drilling zone) and the focussing lens, thus significant dimensions which very severely limit the options for gaining access to the hole.

With the evolution of manufacturing techniques for certain parts however, difficulties are now encountered in the implementation of machining by laser beam because of the increasingly complex shapes involved. Certain zones turn out not to be accessible to the laser beam. The laser beam drilling heads with their end nose-piece that are known to the applicant all have a rectilinear optical path. Thus, when a part includes a portion of surface that is masked by another part of the part, then the latter cannot be reached by the beam produced at the output of such a nose-piece. Adding mobility to the drill head on which the nose-piece is mounted does not solve this accessibility problem.

The problem arises now in particular with the evolution of casting techniques for the manufacture of distributor sectors.

The technique for the manufacture of such sectors, according to previous designs, consisted of casting the distributor elements of a single blade, then drilling the wall of the blade—accessible using the straight nose-pieces of previous design—and finally brazing two elements along the length of platforms in order to obtain a two-blade block. A straight machining head is suitable for the individual drilling of blades. However this method of manufacture is very lengthy and costly, and involves problems of quality because of the risks associated with blade assembly by brazing, dimensional risks concerning the passage section, and so on. It also renders the part fragile at the assembly joint.

It is now possible to perform the casting of parts with two-blades or more, together with their inbuilt cooling circuits. The drilling of cooling orifices in such a single-block distributor sector or element with at least two blades between the lower and upper platform, is not possible everywhere with a straight nose-piece. Certain portions are inaccessible.

The applicant has therefore set as its objective the creation of a nose-piece that provides access to zones that are difficult to reach.

According to the invention, this objective is met with a nose-piece for the laser beam drilling head of a drilling machine, emitting a pulsed laser beam, where the drill head includes a resource which is suitable for the mounting of the nose-piece, where the nose-piece includes a first laser beam entry opening and a second pulsed laser beam output opening, and with a beam focussing resource arranged upstream of the second opening.

This nose-piece is characterised by the fact that a mirror is positioned in the optical path of the laser beam downstream of the said beam-forming resource, so that the emerging beam forms an angle of less than 180° with the entering beam, and where the nose-piece includes a laser-beam fluid assisting feed that is arranged so that the said fluid is emitted via the second opening in the same direction as the laser beam.

By virtue of the invention, it is possible to create a nose-piece that can be slanted very significantly in relation to the surface of the part to be treated, in accordance with the space available above the surface, and in the axis of the hole to be drilled.

In addition, by enabling the creation of bores in areas which were previously inaccessible, a nose-piece according to the invention opens the possibility of achieving large improvements in cooling efficiency.

Such a nose-piece also allows optimisation of the methods of manufacture, and broadens the options for designing certain parts, to the extent that these are not linked to the necessity to provide accessibility for the drilling resource.

The assistance fluid is advantageously a gas, whose function is not only to play a part in the removal of waste material produced by the beam but also to cool the mirror, which is subjected to the impact of the focussed laser beam, and to assist with the melting and removal of particles where appropriate.

We are already familiar with laser beam welding heads with an end nose-piece that includes a 90° beam-diversion mirror. As an example, the applicant is the holder of patent EP 1 273 382, concerning a miniaturised laser-beam welding appliance. The subject of this patent is a welding head whose frontal opening can be brought very close to the surface to be welded without staining the optical components with the vapours and metal sprays produced in the melting process, and without disrupting this melting metal with the stream of gas exiting from the frontal opening. However this type of tool is designed to be located as an extension to an optical fibre, and has a suitable optical system with, in particular, a beam-forming lens and a focussing lens. Although it is said to be miniaturised, it is still of significant size in relation to the application envisaged in this present invention. Moreover, the lasers used for the welding are continuous gas devices of the $CO_2$ type, in contrast to machining lasers which are characterised by their operation in pulsed mode with a specific peak power. The design of the above-mentioned patent is therefore not appropriate to an application for the machining of metal parts.

It is preferable that the mirror should be held by a removable securing resource which allows rapid replacement of the mirror after a series of firings, without having to change the nose-piece.

According to another characteristic, the second opening of the nose-piece is fitted with a means of protection against the projection of waste material by the part being treated. This means of protection, which can be a blade, for example, prevents the re-direction mirror from being stained by the waste material.

Again according to the invention, such a nose-piece is used for the drilling of cooling orifices in the blades of a distributor block, composed of at least two blades, of a gas turbine engine, especially in the aeronautical field. In particular, one is thinking of the case of a complete wheel such as a single-block vane disk.

The diameter is then adapted so as to allow positioning between the blades of a high-pressure distributor sector of a gas turbine engine.

The ability to drill the blades of a two-blade distributor block constitutes a significant advantage in their manufacture. The section of passage between the blades of a distributor is an important parameter for the functioning of the engine. It is this which calibrates the gas stream coming out of the combustion chamber and that drives the high-pressure rotor. Usually, the single blades produced by casting are assembled by brazing. The tolerances of the brazing and the machining must be matched to the very fine level of tolerance of the section of passage imposed by engine operation. Thus, other than the gain in productivity, being able to create two-blade distributor blocks directly can also be a considerable advantage in improving engine output, and renders the part more solid by the removal of one assembly.

According to another characteristic, the focal point of the beam is removed from mirror by a distance of less than 15 mm. In the case of distributors, this distance allows sufficient miniaturisation of the nose-piece in relation to the space available between the blades of the block to provide optimal access to all points on the upper and lower surfaces. This very small distance results in a very high level of accessibility to all the other types of part, such as the combustion chamber rings for example, or any other application requiring holes that are not accessible with the technology of straight nose-pieces used in previous designs.

Other characteristics and advantages will emerge from the following description of one method of implementation, with reference to the appended figures, in which:

FIG. 1 is a schematic representation of a laser-beam drilling device according to the invention, FIG. 2 is a longitudinal section of a machining head and a nose-piece according to the invention, FIG. 3 is an enlarged view of the end of the nose-piece of FIG. 2 in section along 3-3, FIG. 4 is an exploded view of the end of the nose-piece, with the different elements of which it is composed.

FIG. 1 illustrates an example of the implementation of a laser-beam drilling device according to the invention. Only the essential elements are shown. Here they are in position for the drilling of distributor blades.

The laser source 1 can, for example, be of the YAG-Nd pulsed type, with a wavelength of 1064 μm. A laser beam 2 is transmitted by the appliance up to the machining head 3. This head includes an assistance fluid entrance 31 and a tubular portion 32 along the optical path C of the beam. The optical system 33 for focussing the beam is also located within the head. This is a lens whose focal length determines the focus point of the beam downstream.

A nose-piece 4, in metal for example, is fixed, in a removable manner, to the downstream end of the head 3 in the extension of the optical path of the laser beam. The nose-piece includes a first opening 41 for entry of the laser beam coming from the tubular portion of the head 3, and a second opening 42 for the exit of the beam. According to the method of implementation shown here, this exit 42 is lateral. A re-direction mirror 5 is positioned across the optical path C at an angle here of 45°, and therefore turns the beam by 90°. The convergent laser beam is concentrated into a point at a distance from the re-direction mirror called the focus point. This nose-piece 4 according to the invention is mounted on the head 3 as a replacement for the straight nose-piece of previous design. In this method of implementation, the head 3 and the assembly of the appliance therefore require no modification. Only the nose-piece 4 is new.

Since the re-direction mirror intercepts the beam after it has been focussed, the density of the energy reflected is very high. The factors to be considered concerning the mirror are, in particular, its physical limits and its life expectancy. The first is determined by the energy density of the laser and the second by the peak power. The mirrors, of the high flux type, are composed of a substrate and are subjected to a treatment to suit the wavelength employed. Two examples of materials used to create this the substrate are silica glass and borosilicate glass (BK7). These have a flow capacity of 73 $J/cm^2$ for the BK7 and 75 $J/cm^2$ for the silica glass. The treatments consist of layers of dielectrics which determine the wavelength and the angle of incidence of the mirror.

Because the beam is diverted laterally, it is possible to drill relatively inaccessible areas of a part. As illustrated in FIG. 1, part 71, and its equivalent 72, is an element of a gas turbine engine distributor block 8, composed of two blades, 71 and 72. By virtue of the device of the invention, it is not necessary to separate the two blades. The nose-piece 4 at the end of the head 3 can enter easily into the space that exists between the two blades of the block, and is able to drill orifices equally well along the upper surface of blade 71 and along the lower surface of the adjacent blade 72. The diameter of the nose-piece can be 10 mm close to its end, for example. It can be positioned in a space as small as 20 mm.

FIG. 2 illustrates a second method of implementation of the nose-piece. The head 13 includes a support plate 131 with a focussing lens 132 protected by a blade 133. The assembly is covered by a ferrule 134 which is extended by a support 135 for the nose-piece 14. The nose-piece 14 is mounted on the support 135 by an external coupling device 140. The body of the nose-piece itself is composed of cylindrical portions 141 of a diameter that decreases toward its end.

FIG. 3 shows the end of the nose-piece in greater detail, and FIG. 4 is an exploded view of the different parts of which it is composed. The nose-piece is drilled in the extension of its tubular part and includes a housing 142 for a mirror 145. The mirror is held in its housing by a clip 146 composed of a ring and two branches with hooks that engage in notches created in the tube. The presence of the ring means that the part of the beam that is transmitted and not reflected by the mirror will not be absorbed by the nose-piece. The mirror is placed in the housing so as to form a predetermined angle with the optical path of the laser beam. In the direction formed by the optical path after its reflection by the mirror 145, the nose-piece includes a portion of tube 143 that ends in a transverse housing 144 for a protective blade 147 placed transversally to the optical path. The blade 147 is held by a part forming an injector 148 and having a screw thread.

A canal, not shown in the figures, puts the interior of tube 141 in communication with the injector 148.

In operation, the laser beam is focussed by the lens 132 and reflected by the mirror 145. The beam density is maximum at the focal point located downstream of the injector 148. An assistance fluid is introduced under pressure into the nose-piece, coaxially with the beam, and is injected in the direction of the emerging beam by the injector 148. This fluid contributes to the cooling of the mirror by sweeping its surface. The protective blade prevents the waste material ejected from the treatment zone from staining the mirror.

The angle made by the emerging beam from the second opening of the nose-piece with the incident beam is determined by the geometry of the part to be treated. Here, the angle is 45°, but it can be different. It is preferably less than 85°, and is between 30° and 80° for example.

By adjusting the distance between the mirror 145 and the focussing lens 132, it is possible to set the distance of the focal point F in relation to the mirror 145 to an optimal value, in the light of the ability of the latter to handle the energy that it must absorb. In fact, by moving the mirror backwards, one draws nearer to the focal point of the mirror, but the energy density of the beam on the mirror increases until it reaches a limit value beyond which the mirror breaks down rapidly. In order to get around this drawback, it is possible to extend the focal length by using an appropriate focussing lens.

It should be noted that because of the miniaturisation of the nose-piece, a means to allow accurate centring of the position of the latter may be an advantage.

According to another method of implementation which is not shown here, the mirror 145 is of the concave type.

According to another method of implementation an additional focussing lens is placed downstream of the mirror 145.

Drilling tests have been performed on a block composed of two blades assembled between two platforms for a high pressure monocristaline or equiaxial cooled distributor for a gas turbine engine. The nose-piece, and in particular its end supporting the mirror, had been sufficiently miniaturised to enable access to the majority of situations involving two surfaces, upper and lower, facing each other. In this case, use was made of a set of nose-pieces with re-direction angles that differed according to the zone to be reached, and a straight nose-piece for one part. The laser source employed was of the YAG Nd pulsed type, with the characteristics of the device presented earlier The invention claimed:

1. A nose-piece for the laser-beam drilling head of a drilling machine, the nose-piece comprising:
    a laser beam entry opening for receiving an entering pulsed laser beam and a laser beam exit opening for emitting an emitted pulsed laser beam,
    a focusing means for focusing said entering pulsed laser beam, said focusing means being arranged upstream of the laser beam exit opening,
    a mirror positioned in an optical path of the entering pulsed laser beam downstream of said focusing means wherein said mirror is configured to reflect the entering pulsed laser beam into the direction of said emitted pulsed laser beam such that said emitted laser beam forms an angle of less than 180° with the entering pulsed laser beam, and
    a laser-beam fluid assisting feed configured to emit a fluid via the laser beam exit opening in the direction of the emitted pulsed laser beam, and
    a blade configured to protect said mirror against projection of waste material, wherein said blade is positioned between said mirror and said laser beam exit opening.

2. A nose-piece according to claim 1, wherein said mirror is held by a removable means for securing said mirror in said nose-piece.

3. A nose-piece according to claim 1, further comprising means for protecting said mirror against projection of waste material from a part being treated.

4. A nose-piece according to claim 1, wherein said emitted pulsed laser beam forms an angle of less than 85° with the entering pulsed laser beam.

5. A nose-piece according to claim 1, wherein said nose-piece has an outer diameter adapted to allow positioning between the blades of a high-pressure distributor sector in a gas turbine engine.

6. A nose-piece according to claim 1, wherein said blade defines a canal through which said fluid and said emitted pulsed laser beam pass.

7. A nose-piece according to claim 1, wherein said mirror comprises a substrate containing silica glass.

8. A nose-piece according to claim 1, wherein said mirror comprises a substrate containing borosilicate glass.

* * * * *